(12) United States Patent
Vila (10) Patent No.: US 7,883,094 B2
(45) Date of Patent: Feb. 8, 2011

(54) OFFSET STACKED SEALING SYSTEM

(75) Inventor: Smail Vila, Louisville, KY (US)

(73) Assignee: Delaware Capital Formation, Inc., Wilmington, DE (US)

( * ) Notice: Subject to any disclaimer, the term of this patent is extended or adjusted under 35 U.S.C. 154(b) by 421 days.

(21) Appl. No.: 12/193,898

(22) Filed: Aug. 19, 2008

(65) Prior Publication Data

US 2010/0044972 A1    Feb. 25, 2010

(51) Int. Cl.
F16J 15/00    (2006.01)
H02G 15/04    (2006.01)
F16L 21/02    (2006.01)

(52) U.S. Cl. .................. 277/508; 277/545; 277/609; 285/224; 285/267

(58) Field of Classification Search .............. 277/500, 277/503, 505, 508–509, 543–544, 545, 581, 277/589, 609, 616; 285/224, 267, 338, 346, 285/347, 379, 370, 351–352
See application file for complete search history.

(56) References Cited

U.S. PATENT DOCUMENTS

| | | | |
|---|---|---|---|
| 2,272,811 A | 2/1942 | Nathan | |
| 3,233,907 A | 2/1966 | Stanton | |
| 4,212,474 A | 7/1980 | Arai | |
| 4,441,723 A | 4/1984 | Greenwald | |
| 4,468,041 A * | 8/1984 | Yoshimura et al. | 277/584 |
| 4,706,971 A | 11/1987 | Schirmer | |
| 4,767,123 A | 8/1988 | Kiese | |
| 5,106,129 A * | 4/1992 | Camacho et al. | 285/233 |
| 5,275,422 A | 1/1994 | Rehfeld | |
| 6,059,323 A | 5/2000 | Ekholm et al. | |
| 6,179,339 B1 | 1/2001 | Vila | |
| 6,835,084 B2 | 12/2004 | Poon et al. | |
| 6,880,863 B2 * | 4/2005 | Vila | 285/267 |
| 7,549,836 B2 * | 6/2009 | Anderson et al. | 415/113 |
| 7,556,295 B2 * | 7/2009 | Holzheu | 285/224 |

FOREIGN PATENT DOCUMENTS

FR    2448634    9/1980
GB    1046601    10/1966

* cited by examiner

Primary Examiner—Vishal Patel
(74) Attorney, Agent, or Firm—Franklin L. Gubernick (57) ABSTRACT

The invention is a sealing system that employs a unique array of offset components, including multiple seal rings, to provide an improved seal with enhanced functionality. In the preferred embodiment, a groove contains two canted-coil springs that are located in a side-by-side relation beneath a pair of expander rings that are also in a side-by-side relation. Located atop the expander rings are three seal rings that are similarly arrayed in a side-by-side relation. To prevent a leak path through the expander rings, a center one of the seal rings overlies the area between the two expander rings.

19 Claims, 6 Drawing Sheets

OFFSET STACKED SEALING SYSTEM

FIELD OF THE INVENTION

The invention is in the field of sealing systems that create a barrier to the passage of fluid. More particularly, the invention is a sealing system that employs a unique array of offset components, including multiple seal rings, to provide an improved seal with enhanced functionality. In the preferred embodiment, the sealing system is employed in a flexible coupling and comprises, in a stacked array, at least one canted-coil spring, a plurality of expander rings and a plurality of seal rings. The seal rings are located to cover any gap between adjacent expander rings.

BACKGROUND OF THE INVENTION

It is not uncommon for a piping system that contains a high temperature fluid to employ specialized seals at various points in the system. Such points may be found where a connection is made between two or more adjacent piping sections and/or where a component is connected to a section of pipe. When a flexible coupling is used in a piping system, the coupling will typically feature at least one specialized seal.

A jet aircraft's bleed air system is an example of a piping system that employs specialized seals. The system fluid, high temperature air, is bled from at least one of the plane's engines and travels through a duct/piping system within the aircraft to accomplish various functions, such as engine cooling, control of the cabin temperature, and de-icing of portions of the plane's exterior surface. It should be noted that the words pipe, duct, conduit, tube and tubular structure are herein considered interchangeable and all refer to a tubular structure, or even a cylindrical opening, through which a fluid can travel.

Typically, a bleed air system will employ at least one flexible coupling (also commonly known as an alignment joint, a flexible joint, a slip joint, an expandable coupling and a flexible connection) to flexibly connect adjacent duct sections, and/or to connect a section of duct to a component, such as a jet engine. The coupling includes structure that enables it to compensate for misalignments of the ductwork and elongation or contraction of the ductwork brought about by temperature changes. The coupling can also enable the piping/duct system to compensate for movements of the engine or aircraft structure due to various factors including vibration, changes in engine speed and/or loading, and air turbulence.

In the prior art, a number of different specialized seals have been employed in flexible couplings used in aircraft bleed air systems. Since the air flowing through such a system can have a temperature above 600 degrees Fahrenheit, many of these prior art specialized seals take the form of multi-component sealing systems. These systems feature multiple seal rings that are each made of a heat-resistant material and are typically in the form of an annulus.

An example of a flexible coupling used in a bleed air system is taught by Camacho et al in U.S. Pat. No. 5,106,129 entitled Flexible Coupling for Transferring a Fluid Between Two Fluid Conduits. Camacho et al teaches a sealing system that makes use of a pair of seal rings located in a side-by-side relation that overlie a pair of similar width expander rings, that are also deployed in a side-by-side relation. To enable diametrical changes in the seal rings, each seal ring is a split ring by virtue of a thru-cut. In order to discourage leakage, said thru-cut is made using a complex zigzag type of step-cut, such as indicated by lap joint 152 in the patent's FIG. 4. Located beneath the expander rings are two similar width metal split springs.

Another example of a flexible coupling used in a bleed air system is provided in my prior patent, U.S. Pat. No. 6,179,339, entitled Seal Rings for Low Loss Flexible Coupling of Gas Conduits. The patent notes that over time, prior art seal rings can lose their effectiveness. The patent teaches combining a seal ring with a garter spring whereby the spring functions to continuously apply pressure on the seal ring. In this manner, the seal ring's contact with adjacent structure is maximized for a prolonged period of time. It should be noted that to discourage leakage, the split in each seal ring employs a step-cut.

When a piping system has a coupling in which fluid is leaking past a seal ring, the usual method to restore system integrity involves replacement of the seal ring(s). In a typical jet aircraft, replacing a seal ring can be both costly and time consuming, especially if the aircraft is caused to be out of service for a period of time.

It is a first object of the invention to provide a sealing system that is highly effective at preventing fluid leakage.

It is a second object of the invention to provide a sealing system that is extremely durable and can prevent fluid leakage for an extended period of time.

It is a third object of the invention to provide a sealing system that can absorb some of the loads that may be created at a seal point due to vibration, piping misalignment, and piping movements.

It is a fourth object of the invention to provide a sealing system that is relatively inexpensive to fabricate since the split in each seal ring employs a simple butt-cut in lieu of a complex step-cut.

It is a fifth object of the invention to provide a sealing system that is relatively easy to install.

SUMMARY OF THE INVENTION

The invention is a sealing system designed primarily for use in a flexible coupling for a piping system. More particularly, a sealing system in accordance with the invention features a unique array of offset components in which multiple seal rings are urged toward a complementary surface and are arranged in a manner that overlaps underlying components of the sealing system. The sealing system's design minimizes fabrication costs while maximizing sealing effectiveness and ease of installation.

In the preferred embodiment, a flexible coupling that employs at least one sealing system in accordance with the invention includes a tubular sleeve and a tubular seal ring holder. The exterior surface of the seal ring holder features an outwardly-facing, circumferentially-extending endless groove. Located in a side-by-side relation at the bottom of said groove are two canted-coil springs. Two expander rings, in side-by-side relation, are also located in said groove wherein they are in direct contact with, and positioned outwardly of, said springs. Located at least partially, and preferably predominantly, in said groove, outwardly of said expander rings, are three seal rings that are arrayed in a side-by-side relation. The seal rings contact the expander rings and are positioned so that the centermost seal ring overlies the area where the expander rings meet. Each of the springs, expander rings and seal rings is in the form of an annulus and when in an assembled condition, the center axes of these components are collinear.

The primary function of the canted coil springs is to maintain an outward bias on the seal rings via the expander rings.

However, since the springs are readily compressible and provide uniform stress distribution even when subjected to localized loading, they also function to withstand and/or absorb some of the structural system load, system dynamic load and vibration. Furthermore, the springs' high degree of compressibility facilitates installation of the seal rings.

The expander rings are designed to transfer force between the springs and the seal rings, and in doing so, distribute said forces broadly on the bottom surface of each seal ring. Each expander ring includes a discontinuity/gap in the form of a simple butt-type thru-cut in which the cut ends of the ring do not interfit with each other, as in a step cut, but simply face each other. By virtue of that cut, each ring can flex and expand, thereby enabling its diameter to be variable.

The seal rings are designed to provide the primary sealing surfaces that create a barrier to the passage of fluid. Multiple seal rings are employed to maximize sealing ability, allow flexing of the joint and to establish a series of fluid barriers. Each seal ring includes a discontinuity/gap in the form of a simple butt-type thru-cut that is easy to machine and enables the ring to flex and have a variable diameter. The variable diameter allows the outer surface of each seal ring to continuously contact, and conform to, a complementary inner surface of the sleeve portion of the coupling.

In a second embodiment of the invention, the sealing system includes only a single canted coil spring supporting the expander rings. This can enable a narrower configuration than can be achieved using the first embodiment.

The invention is a sealing system that avoids the deficiencies of the prior art while providing numerous advantages. A sealing system in accordance with the invention has an excellent sealing capability, can provide an extremely long service life and is relatively easy to manufacture and install.

DETAILED DESCRIPTION OF THE DRAWINGS

Referring now to the drawings in greater detail, wherein like characters refer to like parts throughout the several figures, there is shown by the numeral 1 a flexible coupling in accordance with the invention.

Figure 1:
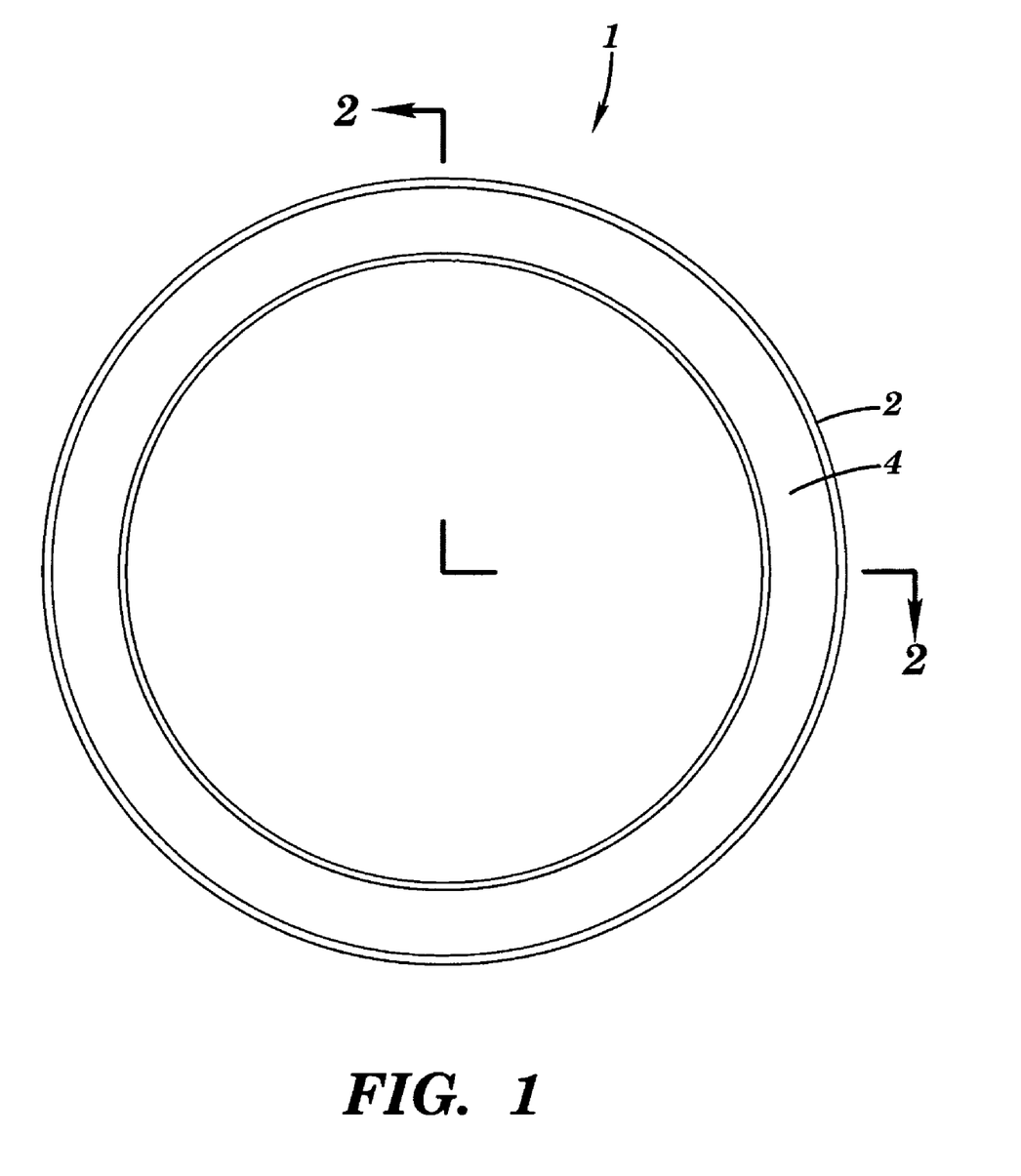
FIG. 1 provides an end view of a flexible coupling that features a sealing system in accordance with the invention.
Figure 2:
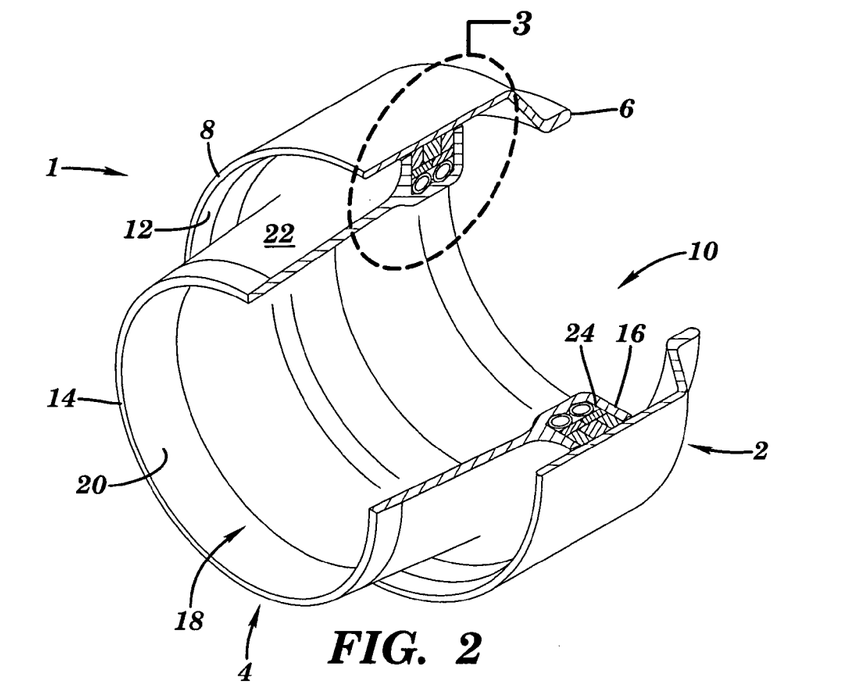
FIG. 2 provides an isometric view of the flexible coupling of FIG. 1 wherein a portion is shown in cross-section per the cutting plane 2-2 indicated in FIG. 1.

As can be seen in FIGS. 1 and 2, the coupling 1 includes a tubular sleeve 2 and a tubular seal ring holder 4. While the coupling shown is designed for use in a high temperature system, such as an aircraft engine's bleed air system, said coupling may be used in other applications.

Sleeve 2 has first and second ends, 6 and 8 respectively. End 6 would typically be welded to a pipe or component, or could be a portion of a pipe or component, or could even be a medial portion of a flexible coupling that has multiple areas where it flexes. End 8 forms a circular opening that leads to the sleeve's cylindrical interior area 10. Said area is bounded by the sleeve's interior surface 12. Surface 12 is preferably smooth and may include an endless groove (not shown) proximate end 8 into which a removable lock ring (not shown) may be placed.

Seal ring holder 4 has first and second ends, 14 and 16 respectively. End 14 would typically be welded to a pipe or component, or could be a portion of a pipe or component, or could even be a medial portion of a flexible coupling that has multiple areas where it flexes. End 16 forms a circular opening that leads into a cylindrically-shaped interior area 18. Said area 18 is bounded by an interior surface 20 of the seal ring holder.

The seal ring holder's exterior surface 22 includes a circumferentially-disposed endless groove 24. As shown, when the coupling is in an assembled condition, end 16, as well as groove 24, will be located within the interior area 10 of the sleeve 2 and fluid would be capable of flowing between areas 10 and 18.

Figure 3:
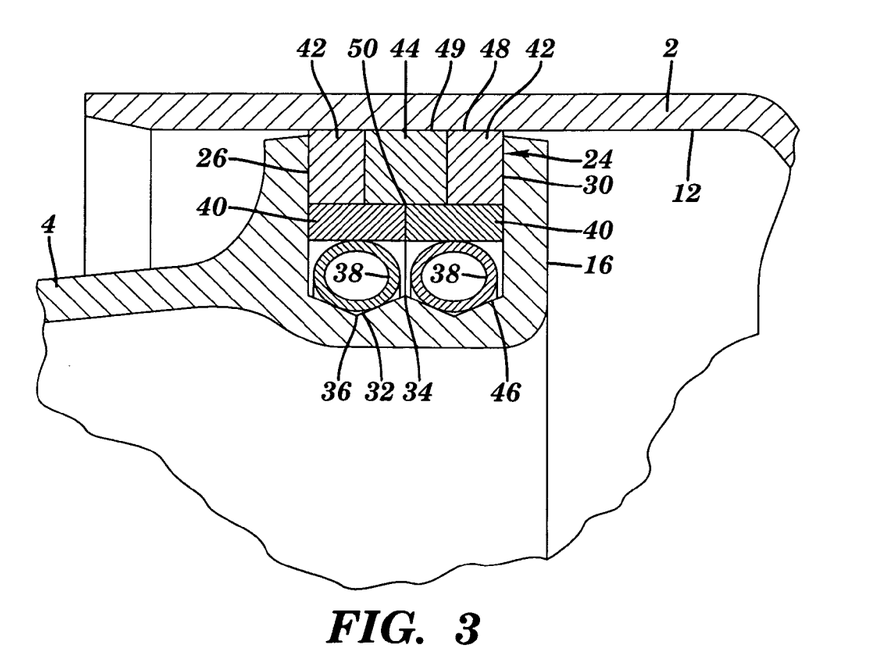
FIG. 3 provides a magnified view of a portion of the coupling shown in FIG. 2.

A magnified view of a portion of the seal ring holder is shown in FIG. 3. As can be seen, groove 24 has first and second parallel sidewalls, 26 and 30 respectively. The groove's bottom surface 32 is preferably in the shape of a flattened 'W' and includes a center-located peak 34 situated between two valleys 36. Alternatively, the bottom surface may be planar.

Located within groove 24 are two canted-coil springs 38 and two expander rings 40. The springs are positioned directly atop, and in contact with, the groove's bottom surface 32. The expander rings are positioned outwardly of, but in contact with, the springs. At least partially, and preferably predominantly, located within the groove are two side seal rings 42 and a center seal ring 44. The seal rings are positioned outwardly of, but in contact with, the expander rings.

The canted coil springs 38 are preferably identical to each other. However, in certain situations, it may be advantageous to employ non-identical springs whereby, for example, one spring is more rigid than the other. In the preferred embodiment, both springs 38 are preferably made of metal, and are each composed of a plurality of loops that together form a ring or annulus. In a canted-coil spring, a compression of the spring will cause the loops to become slightly elliptical, while also causing the loops to lean over in the area where the load is causing the compression. As the loops lean over, the height of the coil, as measured outwardly from the bottom of the underlying valley 36 in the groove's bottom surface, decreases. The groove's bottom surface, by having two valleys 36 and a center peak 34, helps to maintain the springs in the proper position shown. The angled sides 46 of each valley apply a force on side portions of an associated one of the springs that causes the contacted spring to center itself in one of the valleys. In addition, the angled sides 46 provide two lines of contact for each spring, thereby distributing the contact forces between each spring and the seal ring holder.

Figure 4:
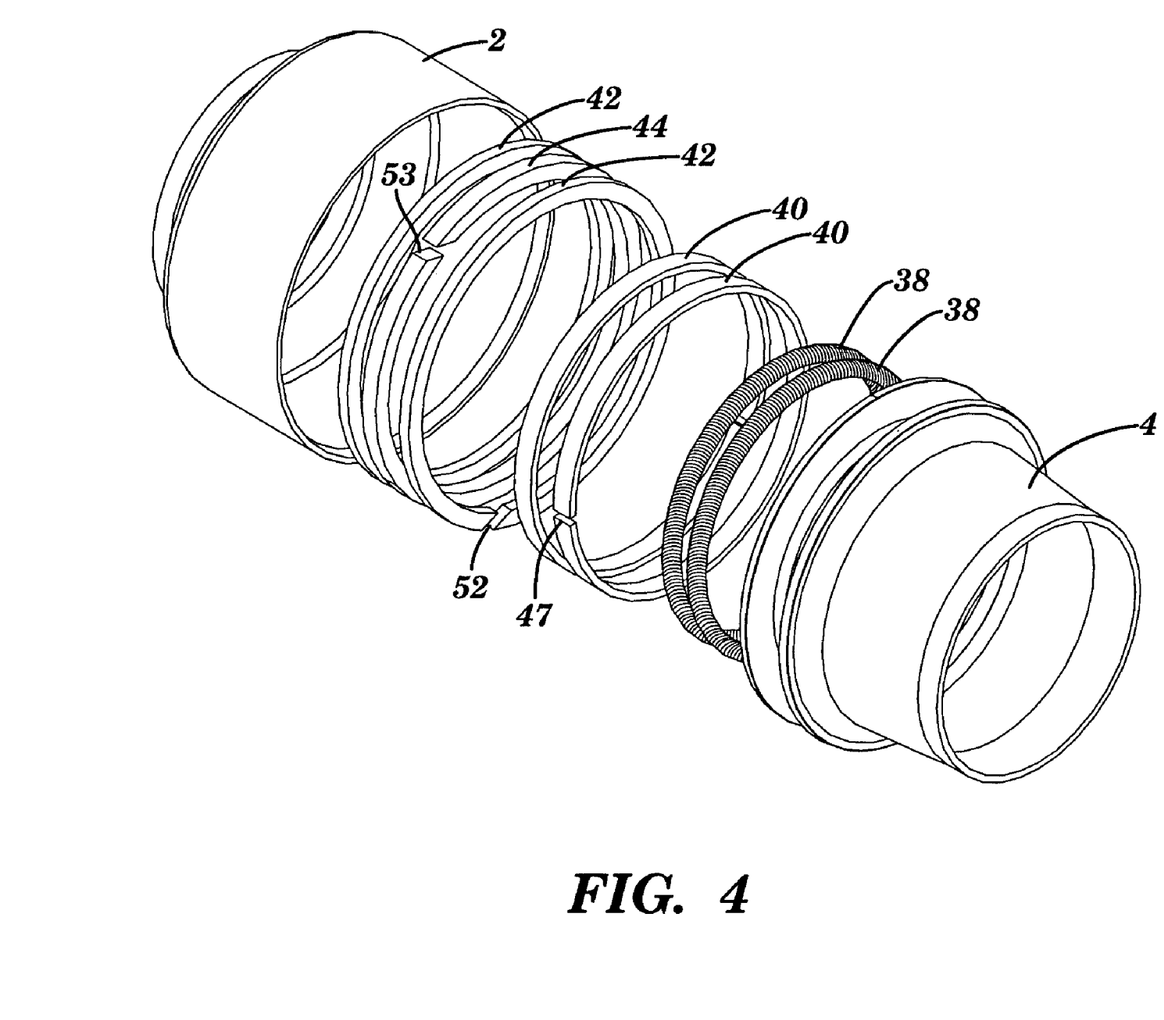
FIG. 4 provides an exploded view of the coupling shown in FIGS. 1 and 2.

The expander rings are preferably made of a metal material and each includes a split in the form of a butt-cut 47 (note FIG. 4). The function of the expander rings is to transmit forces between the coupling's seal rings 42 and 44 and the canted coil springs 38. Since the expander rings contact the entire bottom surface of the seal rings, the transmitted forces are both broadly and evenly distributed on the bottom of each seal ring.

The seal rings 42 and 44 are preferably all made of the same material, but there can be situations where not all of the seal rings are made of the same material. If the coupling 1 is used in a system in which the seal rings will be exposed to a high temperature fluid, all of the seal rings, as well as the sleeve and seal ring holder, will preferably be made of a heat-resistant material, such as metal, with a nickel alloy being preferred. Other possible materials for the seal rings include silicone and heat-resistant plastics including PTFE and PTFE composite materials in which the PTFE is combined with one or more other materials and/or fillers such as EKONOL, carbon and mica. It should be noted that the seal rings can be made from any material that provides sufficient durability, compressibility, resilience and flexibility to enable the seal rings to conform, in a sealing manner, to an adjacent structure while still being relatively stable during their exposure to the physical and chemical conditions of the system in which they are installed. To enhance their sealing ability, the outwardly-facing surface 48 of each seal ring 42 and the outwardly-facing surface 49 of seal ring 44 are preferably crowned to have an arcuate configuration that allows joint angulations while providing excellent sealing characteristics.

As can be seen in FIG. 3, the two side seal rings 42 sandwich the center seal ring 44 between them, with the center seal ring 44 straddling the area 50 where the expander rings 40 abut each other. The size of any gaps/openings in area 50 will depend on how perfectly the side of one expander ring matches the adjacent side of the other expander ring and also how tightly the expander rings fit together.

In the preferred embodiment, the two side seal rings 42 are identical to each other, while the center seal ring 44 is preferably wider than either of the side seal rings 42. The extra width of the center seal ring enhances the center seal ring's ability to create a seal between itself and the interior surface 12 of the sleeve. The extra width of ring 44 also functions to increase its lateral stability and creates a more efficient leak barrier as it more broadly covers the area 50 between the expander rings.

To enable the seal rings to diametrically expand and contract, as well as in some cases to flex, each seal ring preferably includes a split/gap in the form of a butt-cut that extends completely through the ring. Each of the rings 42 has a forty-five degree butt-cut 52. Ring 44 has a similar forty-five degree butt-cut 53. The gap or width of each of said butt-cuts is measured between the two facing surfaces of each cut and is preferably extremely small when the ring is in a non-expanded condition. Said butt-cuts are sized to allow for the thermal expansion that will occur once the rings reach operating temperature. The size of each butt-cut gap will preferably be a minimum amount when the system operating temperature reaches a maximum amount.

FIG. 4 provides an exploded view of the coupling 1. It should be noted that the forty-five degree butt-cuts 52 and 53 in the seal rings, and the butt-cuts 47 in the expander rings, are positioned offset from each other to thereby disrupt any flow path that would allow potential fluid leakage.

When the coupling 1 is in its nominal state, the springs 38 will preferably be about twenty to thirty percent compressed. This causes an expansion force to be continually exerted by the springs on the seal rings via the expander rings. In this manner, the seal rings are always in an expansion mode whereby they continually press into the adjacent surface 12 of the sleeve. Once the seal rings are in use in an operating system, their sealing action will be even further enhanced as system pressure also pushes them into the sleeve's surface 12.

Figure 5:
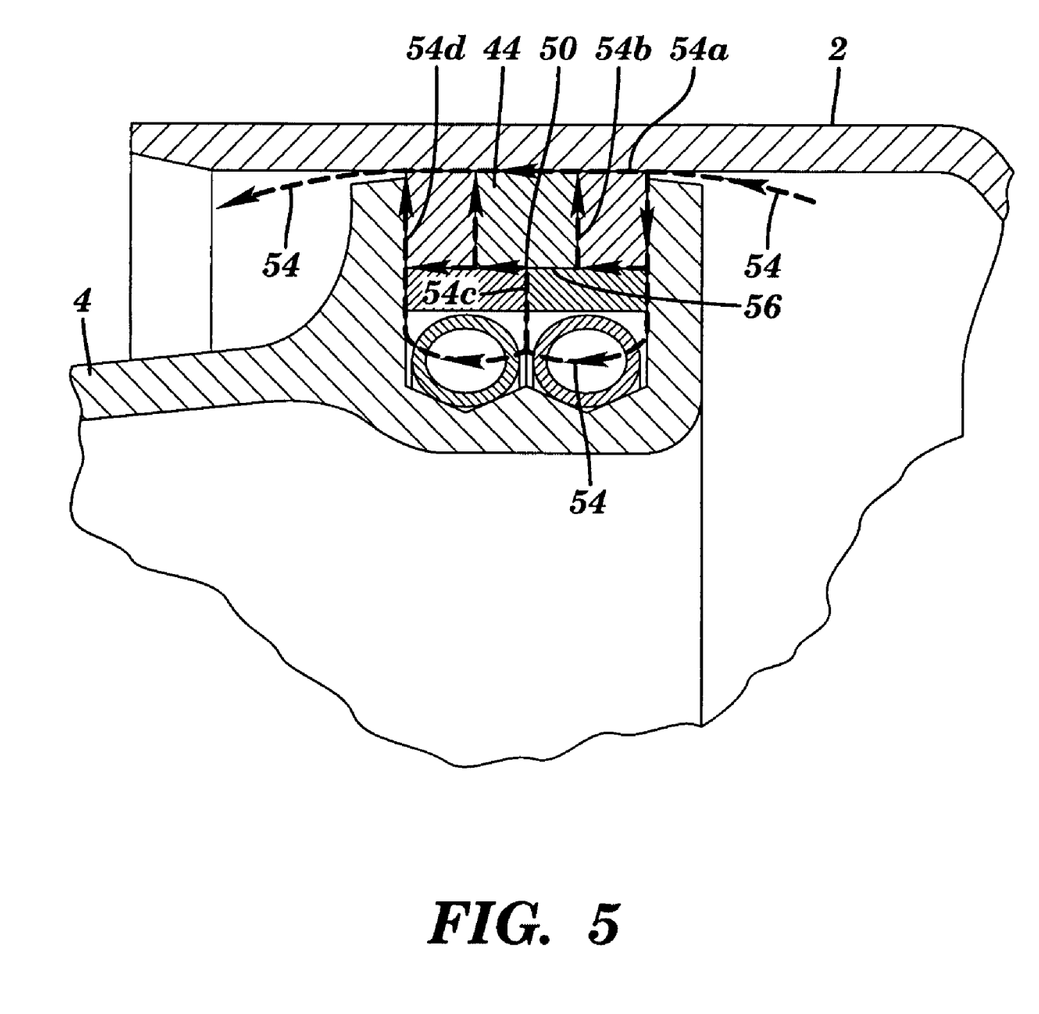
FIG. 5 is identical to FIG. 3, except that it additionally shows a potential fluid leak path.

FIG. 5 shows a similar view to that provided by FIG. 3, but shows the coupling portion when it is in use and functioning to contain pressurized fluid. In the figure, arrows 54a, 54b, 54c and 54d indicate potential fluid leak paths through the coupling's sealing system. As noted by arrow 54a, fluid may attempt to travel directly between the seal rings and the adjacent surface 12 of the sleeve. Arrow 54b indicates a path in which fluid travels down the right-hand side of the rightmost side seal ring, then along the bottom surface of said seal ring, and then back up along the left-hand side of said rightmost side seal ring to join the fluid in path 54a. Arrow 54c shows a path whereby the fluid again travels into the groove area containing the springs, then travels through area 50 between the expander rings, and then goes left and/or right, then up, then left again as it tries to escape from the coupling. Arrow 54d shows a fluid path whereby the fluid travels down the right-hand side of the rightmost side seal ring into the area containing the springs and then upwardly past the left-hand side of the leftmost side seal ring.

Concerning the leak path indicated by arrow 54a, any significant fluid travel via this path is effectively prevented by the seal rings since they press into the adjacent surface of the sleeve 2. There are two forces that cause the seal rings to be pressed into the sleeve. Firstly, the compression of the springs 38 causes said springs to continually apply an upward (per the figure) pressure on the seal rings via the expander rings. Secondly, should system fluid enter the groove and travel into the area containing the springs, pressure from said fluid will be applied to the bottom surface of the expander rings and thereby be transmitted by said expander rings as an upwardly directed force on the seal rings. In this manner, system fluid located near the springs actually enhances the action of the seal rings by applying a force that increases the total force pressing said rings into the adjacent surface of the sleeve.

Concerning the leak path indicated by arrow 54b, fluid may attempt to get past the sealing system by traveling between the center seal ring 44 and the rightmost side seal ring 42. Since at least a portion of the right-hand side surface of the rightmost side seal ring is exposed to full system pressure, this will cause a leftwardly-directed force to be applied to said rightmost side seal ring. This will press the rightmost side seal ring into the center seal ring, thereby significantly blocking this leak path.

Concerning the leak path indicated by arrow 54c, wherein the system fluid tries to travel upward through area 50 between the two expander rings, this is effectively and efficiently prevented by the offset configuration of the components in the groove whereby the center seal ring sits directly atop area 50. Most likely, the bottom surface 56 of the center seal ring would stop fluid travel along path 54c. However, if the fluid traveling through area 50 hits said surface 56 and then turns to the left or right, said fluid would then have to turn again and try to travel upwardly along paths 54a or 54b. In this manner, the configuration of sealing components creates a torturous and serpentine path through which the fluid would have to travel and would cause a significant pressure drop in said fluid. Since the volume of fluid flow through an orifice is directly related to fluid pressure, the created serpentine path and consequent pressure drop functions to prevent any significant volume of fluid from traveling along path 54c and out of the coupling. While some prior art seal rings employ a step cut to create a torturous path for fluid flow, the invention creates said path without requiring complicated machining of the seal rings and achieves an improved result.

Concerning the leak path indicated by arrow 54*d*, should system fluid enter the area of the groove containing the springs, it may try to escape by traveling past the left-hand side of the leftmost side seal ring 42. However, at least a portion of the right-hand side surface of the rightmost side seal ring 42 is exposed to full system pressure. This pressure will cause a leftwardly-directed force to be applied to said rightmost side seal ring. Since the rightmost side seal ring can contact the center seal ring, which can then contact the leftmost side seal ring, said leftwardly-directed force will travel through the center seal ring and be applied to the leftmost side seal ring. As a result, the leftmost side seal ring will be pressed into the left-hand wall of the groove and effectively block any upward travel of the system fluid along the left-hand side of the leftmost side seal ring. In addition, since the fluid pressure of any fluid traveling this path will be reduced due by the pressure drops inherent in its travel path, fluid loss via this path should be minimal, or zero.

Besides providing excellent sealing ability, a sealing system in accordance with the invention is far easier to fabricate than multi-part sealing systems of the prior art. In the invention, the seal rings and expander rings can be pre-cut to size from any suitable stock. Next, instead of cuts of a complicated shape being made in the rings to enable them to diametrically expand and contract without leaking, only a simple butt-cut is required to be made in each ring (note FIG. 4) since the overlapping components of the sealing system prevent leakage. While a forty-five degree butt-cut is preferred, a ninety-degree cut, or any other angle of cut, may alternatively be employed. Once the components of the sealing system are fabricated, assembly of the coupling 1 is relatively fast and easy by virtue of the ready compressibility of the canted coil springs in combination with the use of a simple butt-cut type of thru-cut in the rings.

To assemble coupling 1, the canted coil springs are first stretched and seated within the seal ring holder's groove 24 until they are positioned as shown in FIGS. 2 and 3. Next, the expander rings are opened slightly, made possible by the butt-cut in each ring, and placed into the groove atop the springs. Each seal ring is then opened slightly, made possible by the butt-cut in each ring, and inserted into the groove where they rest atop the expander rings per the placement shown in FIGS. 2 and 3. As noted previously, the rings are all positioned so that cuts 47, 52 and 53 are offset from each other, to thereby block potential leak paths. Finally, the seal ring holder is pushed into the sleeve, whereby the contact between the seal rings and the interior surface 12 of the sleeve causes the springs to be compressed. The springs then cause the seal rings to press into surface 12 in a tight manner. This causes the outwardly-facing surfaces 48 and 49 of the seal rings to continuously sealingly-engage the sleeve's surface 12, even if there is a misalignment, or relative movement, between the seal ring holder and the sleeve.

Figure 6:
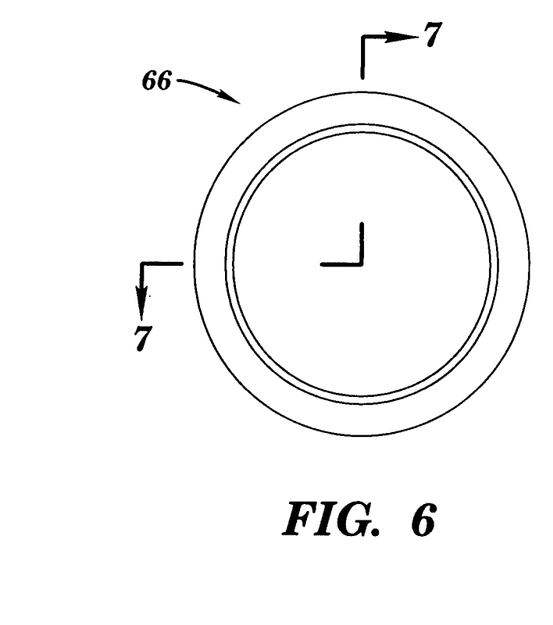
FIG. 6 provides an end view of a flexible coupling that features two instances of a sealing system in accordance with the invention.
Figure 7:
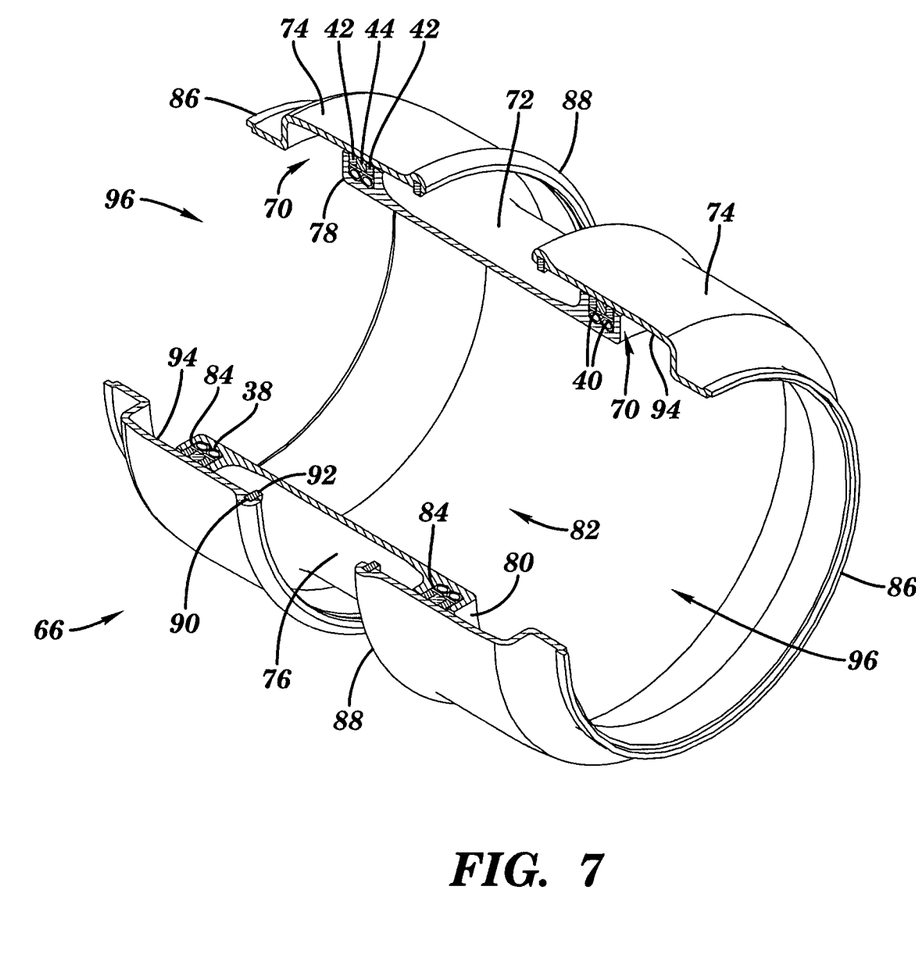
FIG. 7 provides an isometric view of the coupling shown in FIG. 6 and includes a portion in cross-section per the cutting plane 7-7 indicated in FIG. 6.

FIGS. 6 and 7 show a flexible coupling 66 that has two areas 70 where it can flex and a sealing system in accordance with the invention installed in each area. The coupling comprises a single, center-located tubular seal ring holder 72 and two end-located identical sleeves 74.

The seal ring holder 72 has a center portion 76, first and second end portions, 78 and 80 respectively, and an interior area 82. Each end portion features an external endless groove 84 (preferably identical to groove 24 in the first embodiment) in which is located a sealing system identical to that used in coupling 1. The sealing system comprises two canted coil springs 38, two expander rings 40, two side seal rings 42 and a center seal ring 44.

Each of the sleeves 74 is substantially identical to sleeve 2 of coupling 1 and includes an outer end 86 adapted for connection to an adjacent fluid conduit (not shown). Each sleeve also includes an inner end 88 that features an inwardly-facing endless groove 90 into which is received a removable lock ring 92 that prevents the seal ring holder from disengaging from either sleeve. The two sleeves feature substantially identical interior surfaces 94 and interior areas 96. It should be noted that the interior area 82 of the seal ring holder is in fluid communication with both sleeve interior areas 96.

The function of the seal rings, expander rings and springs in each groove 84 is identical to the equivalent elements in coupling 1. By having two areas 70 at which the coupling can flex, coupling 66 can be capable of greater pure angulation, length compensation and lateral articulation than coupling 1. Furthermore, the multiple flex areas allow any loading and vibration forces to be distributed between said areas.

Figures 8, 9, 10:
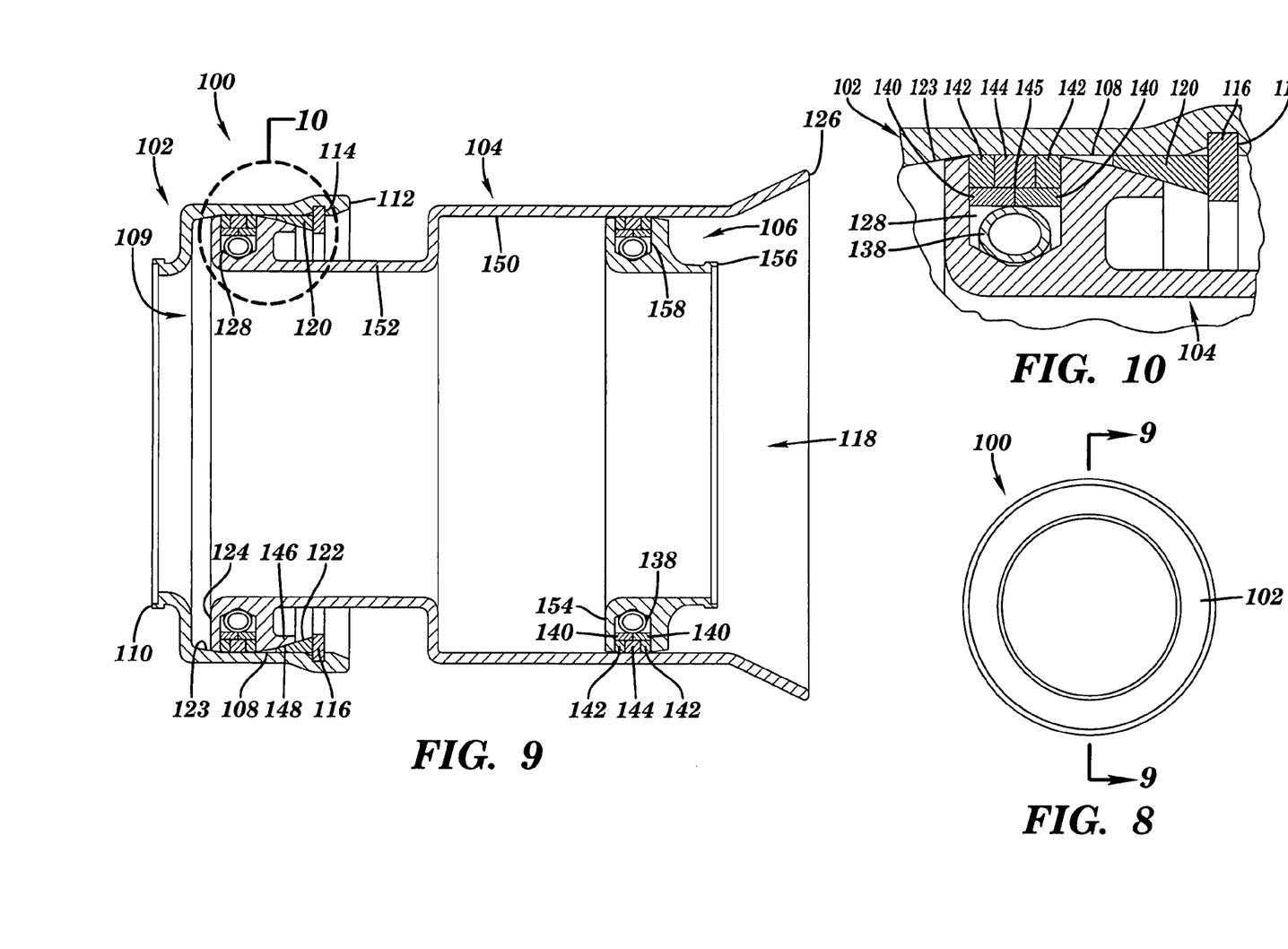
FIG. 8 provides an end view of a flexible coupling that features two instances of a sealing system in accordance with a second embodiment of the invention.
FIG. 9 provides a cross-sectional side view of the coupling of FIG. 8.
FIG. 10 provides a magnified view of a portion of the coupling shown in FIGS. 8 and 9.

FIGS. 8 and 9 show a flexible coupling 100 that comprises a tubular sleeve 102, a tubular first seal ring holder 104 and a tubular second seal ring holder 106. Each of said seal ring holders includes a sealing system in accordance with a second embodiment of the invention. Coupling 100 is designed to allow angular articulation and a significant amount of axial motion at one end, and only angular articulation at its other end.

Sleeve 102 has an interior surface 108, an interior area 109 bounded by said surface, a first end 110 and a second end 112. Preferably, end 110 will be operatively connected to a conduit (not shown) or a component (not shown) in a manner that enables the transfer of fluid between area 109 and said conduit/component. Proximate end 112, and located in surface 108, is an endless groove 114 into which is removably received a lock ring 116. The lock ring functions to secure a guide member 120 within said sleeve whereby it is in contact with the sleeve's surface 108.

The guide member 120 is a form of seal ring and is ring-shaped. A butt-cut extends through the guide member and allows the member's diameter to be changed to enable proper positioning and sealing of the guide member in the sleeve. An inwardly-facing surface 122 of the guide member preferably has a shape designed to be complementary to a portion of a sphere's outer surface. A portion 123 of the sleeve's inner surface 108 adjacent the guide member has a similar shape in which it also is designed to be complementary to a portion of a sphere.

The first seal ring holder 104 has an interior area 118 and first and second ends, 124 and 126 respectively. Located proximate end 124 is an outwardly-facing endless groove 128. Located within said groove is a sealing system in accordance with a second embodiment of the invention.

FIG. 10 provides a magnified view of groove 128 whereby one can readily see that the sealing system employed in groove 128 is very similar in overall design to the sealing system employed in groove 24 of coupling 1. However, the sealing systems differ in that the system employed in groove 128 uses a only single canted coil spring 138. The spring is in the form of an annulus and supports a pair of expander rings 140. Located atop the expander rings are two side seal rings 142 and a center seal ring 144. As in the first embodiment, the center seal ring covers the area 145 between the two underlying expander rings. It should be noted that the seal rings, and the guide member, are preferably made from the same materials as could be employed for the seal rings of coupling 1.

Located adjacent groove 128 is a sideward-extending wing portion 146 of the seal ring holder. Said wing portion features an outwardly-facing surface 148 that forms a portion of a sphere and is complementary in shape to surface 122. When the sealing system housed in groove 128 of the first seal ring holder sweeps the interior surface 108 of the sleeve, the adjacent complementary surfaces 122 and 148 contact each other. This provides an additional sealing area while the guide member functions to also retain the seal ring holder in the sleeve.

The width of the guide member 120 is preferably precisely calculated and designed to allow maximum angulation without the guide member contacting the nearby seal rings. Since the guide member and seal rings are preferably made of the same material, contact between them could cause galling and/or binding. The use of the guide member 120 enables the left-hand portion of coupling 100 to allow a significant amount of angular movement of the seal ring holder 104 relative to the sleeve 102. This characteristic is useful when one end of a coupling must allow angulation and at the same time, restrain axial travel.

The interior area 118 of seal ring holder 104 is bounded by first and second cylindrical interior surfaces, 150 and 152 respectively. Located in area 118, and proximate surface 150, is the second seal ring holder 106.

Seal ring holder 106 includes first and second ends, 154 and 156 respectively. End 156 is preferably operatively connected to a conduit or component that is not shown. End 154 features an outwardly-facing endless groove 158 that is preferably identical to groove 128 in the first seal ring holder. Located in groove 158 is a sealing system that is also preferably identical to the sealing system used in groove 128. As shown, located within groove 158 are an annular canted coil spring 138, two annular expander rings 140, a pair of annular side seal rings 142 and an annular center seal ring 144. While identical sealing systems are deployed in grooves 128 and 158, either groove may include a different sealing system. The seal rings located in groove 158 contact surface 150 whereby said seal rings form a movable seal with said surface.

It should be noted that while sealing systems in accordance with the invention are shown being used in three different couplings, a sealing system in accordance with the invention could be used in other forms and shapes of couplings and connections. In addition, while multiple forms of seal ring holders have been shown and described, a seal ring holder can be any structure that includes a groove capable of receiving the multiple seal rings, expander rings and at least one spring in accordance with the invention. Furthermore, when a coupling has multiple seal ring holders and/or multiple sleeves, each sleeve and seal ring holder can itself be considered a conduit.

It should also be noted that while at least one canted coil spring has been shown in each embodiment of the invention, other types and shapes of springs may be used in place of the canted coil spring(s). For example, in certain situations, a Marcel spring, or a resilient member, such as a rubber o-ring, may be substituted for a canted coil spring. In addition, while each of the previously described embodiments of the invention employs either one or two springs, a greater number of springs may be employed. Similarly, a greater number of expander rings and seal rings may also be successfully used to create a sealing system in accordance with the invention.

In addition, while coupling 100 is shown having two seal ring holders, a coupling can be fabricated which employs only sleeve 102 and seal ring holder 104. In that case, the coupling would enable a significant amount of angulation of the seal ring holder relative to the sleeve while not enabling any axial travel of said components.

The preferred embodiments of the invention disclosed herein have been discussed for the purpose of familiarizing the reader with the novel aspects of the invention. Although preferred embodiments of the invention have been shown and described, many changes, modifications and substitutions may be made by one having ordinary skill in the art without necessarily departing from the spirit and scope of the invention as described in the following claims.

I claim:

1. A flexible, variable-length coupling capable of fluidically connecting a first conduit to a second conduit, said coupling comprising:
    a tubular sleeve having first and second ends, wherein said sleeve has an interior area, and wherein said first end of said sleeve is capable of being operatively connected to said first conduit;
    a seal ring holder having first and second ends, wherein said seal ring holder has an interior area operatively connected to the interior area of the sleeve, wherein said first end of said seal ring holder is capable of being operatively connected to said second conduit, wherein said second end of said seal ring holder is located within said interior area of said sleeve, wherein an exterior surface of said seal ring holder features an endless groove, and wherein said endless groove is positioned within said sleeve;
    a plurality of springs located within said groove, and wherein each of said springs is in the form of an annulus;
    a plurality of expander rings located within said groove in a position outwardly of at least one of said springs, and wherein each expander ring is ring shaped and contacts at least one of said springs; and
    three seal rings located at least partially in said groove in a position outwardly of at least two of said expander rings, wherein each of said seal rings is ring shaped and contacts at least one of said expander rings and a surface of said sleeve, wherein said seal rings are oriented in a side-by-side relation, and wherein an area between adjacent expander rings is covered by one of said seal rings.

2. The coupling of claim 1 wherein a centermost one of said seal rings overlies portions of two of said expander rings.

3. The coupling of claim 1 wherein each of said expander rings is discontinuous.

4. The coupling of claim 3 wherein each of said expander rings includes a discontinuity in the form of a butt-type thru-cut.

5. The coupling of claim 1 wherein each of said seal rings is discontinuous.

6. The coupling of claim 5 wherein each of said seal rings includes a discontinuity in the form of a butt-type thru-cut.

7. The coupling of claim 1 wherein said groove has two opposing sidewalls and, when viewed in cross-section, a 'W'-shaped surface that extends between said sidewalls, and wherein said 'W'-shaped surface contacts said springs and functions to cause said springs to be positioned at predetermined spaced-apart locations.

8. The coupling of claim 1 wherein said three seal rings includes a center seal ring and two side seal rings, wherein said center seal ring is sandwiched between said side seal rings, wherein each of said seal rings has two opposite side surfaces, wherein a width dimension of any of said seal rings is defined by a distance between its side surfaces, and wherein said center seal ring has a width dimension that is greater than a width dimension of either of the side seal rings.

9. The coupling of claim 8 wherein each of said expander rings has first and second opposite side surfaces and a width dimension measured as a distance between its side surfaces, and wherein the combined width of the expander rings is substantially equal to the combined width of the seal rings.

10. The coupling of claim 1 wherein said second conduit is in the form of a tubular sleeve, wherein said first end of said seal ring holder features an exterior endless groove into which is located at least one spring, a plurality of expander rings and a plurality of seal rings.

11. The coupling of claim 1 wherein said springs are canted coil springs.

12. A sealing system for creating a seal between two inter-fitting structures, said sealing system comprising:
   at least one spring in the form of an annulus;
   a plurality of expander rings, wherein each of said expander rings has opposite side surfaces and is in the form of an annulus;
   at least three seal rings, wherein each of said seal rings has opposite side surfaces and is in the form of an annulus;
   a first structure having an interior surface that defines an inner area through which fluid can pass;
   a second structure having an inner area through which fluid can pass, and wherein said inner areas of the first and second structures are operatively connected to each other in a manner to enable a transit of a fluid; and
   wherein a portion of said second structure is located within said inner area of said first structure and has an exterior surface that includes an endless groove, wherein said at least one spring, said expander rings and said seal rings are all at least partially located within said groove, wherein said expander rings are sandwiched between, and in contact with, said at least one spring and said seal rings, wherein at least one of said seal rings completely overlies a region located between a pair of said expander rings that are adjacent to each other, and wherein a top surface of at least one of said seal rings contacts said interior surface of said first structure.

13. The sealing system of claim 12 wherein there are two of said springs in said groove, and wherein two of said expander rings are sandwiched between said springs and three of said seal rings.

14. The sealing system of claim 12 wherein said at least one spring is a canted coil spring.

15. The sealing system of claim 12 wherein each of said seal rings has a diameter dimension and a butt-type thru-cut that functions to facilitate changes of said diameter dimension.

16. The sealing system of claim 15 wherein said butt-type thru-cut is an approximately forty-five-degree butt-cut.

17. The sealing system of claim 12 further comprising an additional seal ring in the form of a substantially annular guide member that is secured to said interior surface of said first structure, wherein said guide member has a surface that faces said second structure and has a semi-spherical contour, wherein said second structure includes a portion that has a contour complementary to said surface of said guide member and that can contact said surface of said guide member when maximum angulation occurs between the first and second structures.

18. A variable-length flexible coupling capable of extending between a first conduit and a second conduit, said coupling comprising:
   a tubular sleeve having first and second ends, wherein said sleeve has an interior area bounded by a surface, and wherein said first end of said sleeve is capable of being operatively connected to said first conduit;
   a seal ring holder having first and second end portions, wherein said seal ring holder has an interior area, wherein said interior areas of the sleeve and seal ring holder are operatively connected to each other in a manner that can enable a transit of a fluid between said areas, wherein said first end portion of said seal ring holder is capable of being operatively connected to said second conduit, and wherein an exterior surface of said second end portion of said seal ring holder features a circumferentially-disposed groove that is positioned within said interior area of said sleeve;
   at least one canted coil spring, wherein said spring is in the form of a ring and is located within said groove, and wherein said spring contacts an outwardly-facing surface of said groove;
   a plurality of expander rings, and wherein each expander ring is ring shaped and is located within said groove in a manner whereby said at least one spring is sandwiched between said outwardly-facing surface of said groove and at least one of said expander rings; and
   a plurality of seal rings, wherein each of said seal rings is ring shaped, wherein said seal rings are at least partially located in said groove and positioned outwardly of said expander rings, and wherein any gap between adjacent expander rings is covered by one of said seal rings.

19. The coupling of claim 18 wherein each of said seal rings includes a butt-type thru-cut that enables facing portions of the associated seal ring to move away from each other.

* * * * *